No. 859,078. PATENTED JULY 2, 1907.
E. KEMPSHALL.
TIRE.
APPLICATION FILED APR. 5, 1906. RENEWED MAY 9, 1907.
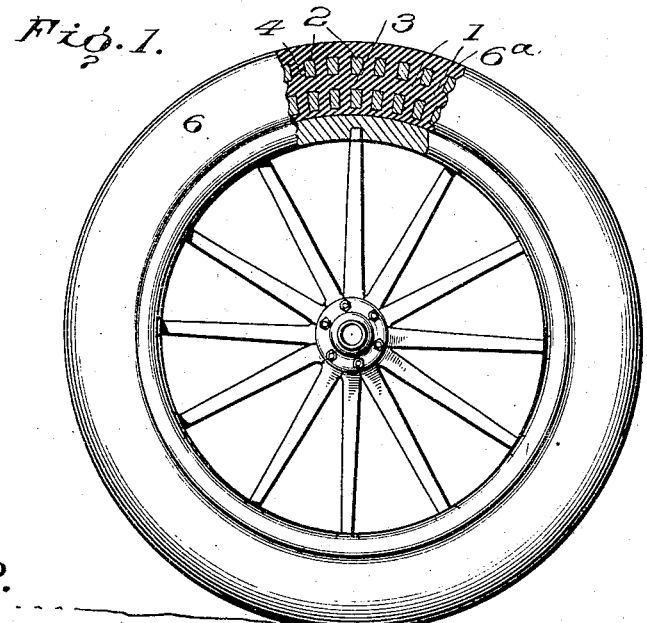
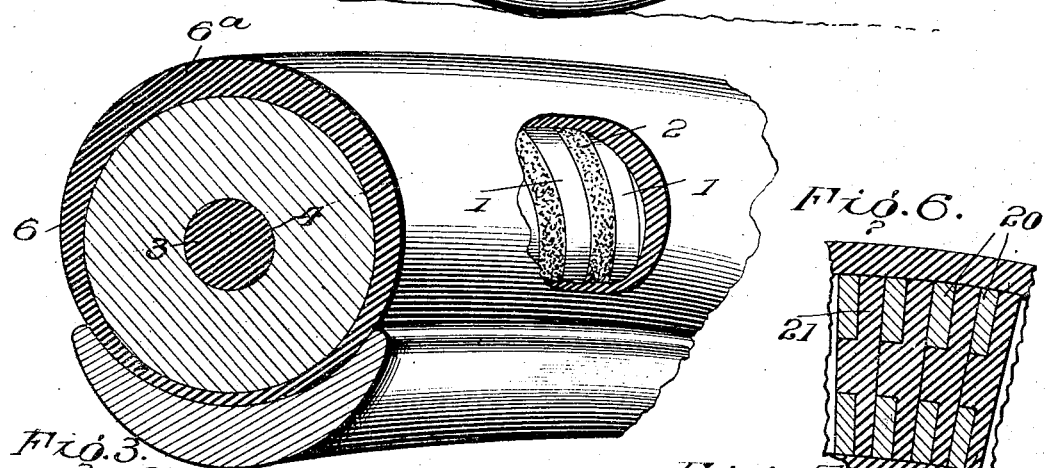
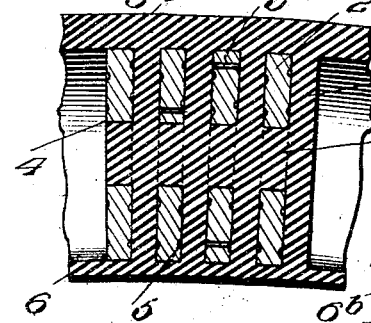
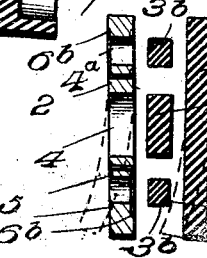
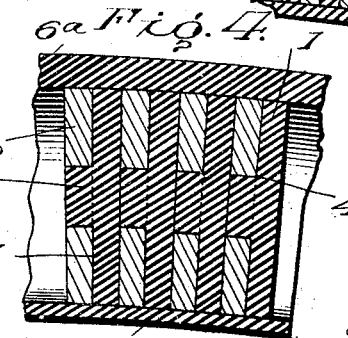
Inventor
Eleazer Kempshall
Witnesses
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,078.     Specification of Letters Patent.     Patented July 2, 1907.

Application filed April 5, 1906. Renewed May 9, 1907. Serial No. 372,766.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in vehicle tires, of the type formed of vulcanizable resilient sections and non-vulcanizable and strengthening sections of material, incased in a resilient covering, and the whole vulcanized when assembled.

The improved tire is made up of resilient sections and plugs of like material, co-operating with sections of strengthening material of leather or like less resilient sections formed with one or more openings to receive the plug or plugs, according to the character of tire to be constructed, and a resilient covering for said sections.

One of the prime objects of the invention is to provide a tire composed of alternately arranged transversely disposed resilient sections of material, and sections of material of less resiliency, with a resilient core and a resilient covering, the whole vulcanized in assembled form.

The invention will be described in the following specification, reference being had to the accompanying drawings in which—

Figure 1 is a side elevation partially in section of a vehicle wheel provided with my improved tire. Fig. 2 is a detail sectional perspective view of the tire, part of the outer covering being broken away to expose the laminated sections. Fig. 3 is a detail longitudinal sectional view of the tire after it has been vulcanized. Fig. 4 is a similar view, before being vulcanized. Fig. 5 is a detail sectional view of a slight modification. Fig. 6 is a detail view of another form of the invention.

Referring particularly to the drawings, my improved tire is constructed of a plurality of sections, 1 and 2, arranged transversely of and alternately disposed throughout the length of the tire. Sections 1, are of relatively high resilient material, as rubber, while the sections 2, are of less degree of resiliency, as leather, fibrous material or the like. The sections conform to the transverse curvature of the tire, and may be round in cross-section or flared at their outer edge to provide means for holding it to a wheel felly.

The sections 1, are preferably in the form of disks of rubber, with plugs or projections 3, extending outwardly from one face. Plugs 3, may be integrally formed with the disks as shown in Figs. 1 to 4, or be in separate pieces as shown at 3ᵃ, in Fig. 5. The less resilient sections of leather 2, are of substantially the same shape and diameter with the flanges as sections 1, and each has a centrally disposed opening 4, to receive plug 3, of the adjacent resilient section 1. While for ordinary use one circumferentially arranged row of plugs will be quite sufficient to assist in withstanding the load strain of a vehicle, other plugs 3ᵇ, may be used if desired. The plugs 3ᵇ, are fitted in openings 4ᵃ, in section 2, the same as plug 3ᵃ, fits in opening 4.

In each face of the less resilient sections I provide small pockets 5, or grooves 6ᵇ, to receive air which may be forced from the rubber sections 1, when they are subjected to the vulcanizing process. By accommodating the air in the pockets, "air bubbles" in the rubber are dispensed with, and the quality of the rubber is considerably improved, and the wearing capabilities prolonged.

A covering 6, constructed of one or more pieces of rubber incloses sections 1 and 2, said covering being materially thickened on its periphery to provide a substantial resilient tread portion 6ᵃ.

The sections 1 and 2, are arranged alternately throughout the length of the tire, with their contacting surfaces cemented, or otherwise secured together to provide a solid body formed of transversely arranged sections alternately disposed, so that a relatively non-resilient section will be effective as a brace and reinforce for the resilient section. When thus assembled the plugs 3, are fitted in the openings of the non-resilient sections, to form a resilient core. The sections are incased with the covering 6, and may be assembled one by one, or the covering may be made in sections, and envelop sections 1 and 2, after they are put together; after the tire sections are assembled, the whole is vulcanized, and the resilient sections 1, and the covering, also the faces of the plugs and the adjacent resilient sections, fuse, forming a substantial rubber tire with embedded transverse strengthening sections between the sections of rubber. The strengthening sections are not only embedded in rubber but are prevented from moving laterally by the substantially solid core produced by the plugs. This core also serves to hold sections 2, in their normal position to resist the too free bending when a load is applied to the tire. When the tire is traveling the strain is not only radial, but circumferential, as shown in dotted lines in Fig. 5, hence the pressure of the walls of the openings 4 is directly on the plugs 3ᵃ, and as stated they serve to return sections 2, to their normal position.

A tire constructed as above described possesses a high degree of resiliency, and is not susceptible to punctures. It possesses the further advantage of being cheap, and owing to the use of relatively non-resilient sections of material, which is unaffected by the vulcanizing process, is very durable.

While I prefer to use rubber and leather as the material for the sections, it is of course obvious, that these materials may be respectively replaced by others having similar characteristics.

In Fig. 6, I have shown the non-resilient sections 20, of a uniform thickness throughout, and the resilient sections 21, tapering to accommodate the space formed between the non-resilient sections. By this construction the non-resilient sections may be stamped out of ordinary stock material, and the resilient sections are molded the desired shape.

What I claim is—

1. A tire constructed of transverse sections of material, selected sections being of vulcanizable material, plugs extending from selected sections to provide a core embedded in the tire, and a resilient cover for the sections, said cover being vulcanized to the sections.

2. A tire composed of transverse sections of material having relatively different degrees of resiliency, plugs extending from alternate sections to provide a core, and means binding the sections together.

3. A tire composed of transverse sections of material having relatively different degrees of resiliency, resilient plugs extending from alternate sections to provide a core, and means binding the sections together.

4. A tire composed of transverse sections of material having different degrees of resiliency, a series of plugs extending between alternate sections to provide a core, and means binding the sections together.

5. A tire composed of transverse sections having relatively different degrees of resiliency, said sections being alternately arranged throughout the length of the tire, plugs extending from alternate sections and fitting in openings in the adjacent sections, and means binding the sections together.

6. A tire composed of transverse sections of resilient and non-resilient sections of material, the latter sections formed with openings, plugs extending from the resilient sections and fitting in the openings in the non-resilient sections, and means binding the sections together.

7. A tire composed of transverse sections of resilient and non-resilient sections of material, plugs connecting the resilient sections, the resilient sections being vulcanized to bind all the sections together.

8. A tire composed of transversely arranged rubber sections, plugs extending from the rubber sections, transversely arranged leather sections formed with openings to receive the plugs, and a cover fitting over the rubber and leather sections, the rubber sections and plugs and the covering being vulcanized to bind the sections together.

9. A tire composed of sections of rubber and leather, plugs embedded between the sections, the plugs and rubber sections being vulcanized to bind the sections together.

10. A tire comprising alternate sections of a resilient and a relatively non-resilient material, a core, and a covering of resilient material to incase the sections, the covering being vulcanized to the resilient sections to bind the sections together.

11. A tire comprising transversely arranged alternate sections of a resilient and a relatively non-resilient material, a core, and a covering of resilient material to incase the sections, the covering being vulcanized to the transversely arranged resilient sections to bind the sections together.

12. A tire composed of alternately arranged resilient and non-resilient sections of material, the non-resilient sections having air pockets formed to receive excess air when the resilient sections are vulcanized, the resilient sections being vulcanized to bind the sections together.

13. A tire composed of alternately arranged transverse sections of resilient and non-resilient sections of material, and air pockets formed to receive excess air when the resilient sections are vulcanized, the resilient sections being vulcanized to bind the sections together.

14. A tire composed of alternately arranged resilient and non-resilient sections of material, the non-resilient sections having air pockets formed to receive excess air when the resilient sections are vulcanized, and a resilient covering vulcanized to the resilient sections and inclosing the non-resilient sections, the resilient sections and the covering being vulcanized to bind the sections and covering together.

15. A tire composed of transverse sections of resilient and non-resilient sections of material, and resilient plugs connecting the resilient sections, the resilient plugs and the resilient sections being vulcanized to bind the sections together.

16. A tire composed of transverse sections of resilient and non-resilient sections of material, resilient plugs connecting the resilient sections, the resilient plugs and the resilient sections being vulcanized to bind the sections together, and a cover fitting over the sections.

17. A tire composed of transversely arranged resilient vulcanizable sections, plugs extending from the resilient sections, transversely arranged relatively non-resilient sections formed with openings to receive the plugs, and a cover fitting over the resilient and relatively non-resilient sections, the resilient sections and plugs and the covering being vulcanized to bind the sections together.

18. A tire composed of resilient and non-resilient sections of transversely alternately arranged sections of material, plugs arranged at intervals between the sections to provide a core embedded in the tire, a resilient covering for the sections, the resilient sections and the covering being vulcanized to bind the sections together.

In testimony whereof I have signed my name to this specification in the presence of two subscribing witnesses.

ELEAZER KEMPSHALL.

Witnesses:
ELIZABETH L. MACFATE,
JNO. IMIRIE.